Oct. 9, 1923.

M. A. DAVIS 1,470,113

PISTON RING

Original Filed Nov. 11, 1920

Morris A. Davis
INVENTOR.

BY Hazard & Miller
ATTORNEYS.

Patented Oct. 9, 1923.

1,470,113

UNITED STATES PATENT OFFICE.

MORRIS A. DAVIS, OF LOS ANGELES, CALIFORNIA.

PISTON RING.

Original application filed November 11, 1920, Serial No. 423,337. Divided and this application filed April 11, 1921. Serial No. 460,584.

*To all whom it may concern:*

Be it known that I, MORRIS A. DAVIS, a citizen of the United States, residing at Los Angeles, in the county of Los Angeles and State of California, have invented new and useful Improvements in Piston Rings, of which the following is a specification.

It is the object of this invention to provide a piston ring having the split therein so arranged as to provide an efficient leak proof ring. This result is accomplished by so arranging the split in the piston ring, that the latter, when compressed within a groove of a piston, will tend to force its ends out of alinement so as to more intimately engage the side walls of the piston ring groove, and also more intimately engage the base of said piston ring groove and the wall of the cylinder in which the piston is received.

The invention will be readily understood from the following description of the accompanying drawings, in which—

This invention is a divisional application of my co-pending application Serial No. 423,337, filed November 11, 1920, for piston rings.

Figure 1:
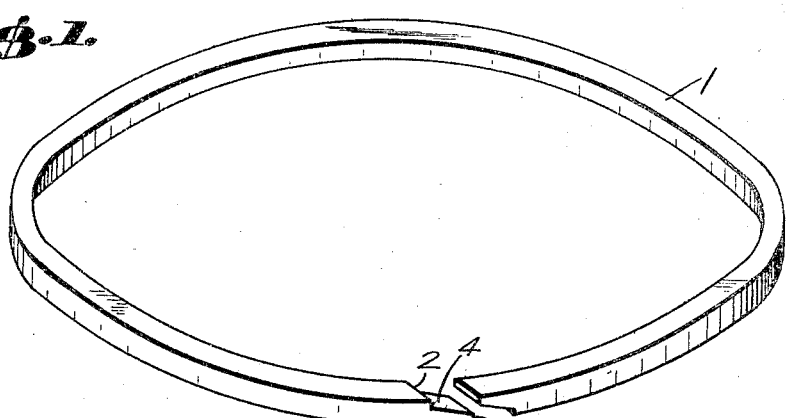
Figure 1 is a perspective view of a piston ring constructed in accordance with the invention, and showing it in normal position before compressed in the groove of a piston.

The piston ring is shown at 1 as of usual construction, except that the split in said ring comprising split substantially parallel cuts 2 and 3 extending inwardly from the respective faces of the ring and circumferentially offset, as clearly shown in Fig. 1. These cuts are connected by a split 4 which extends diagonally across the ring between the respective faces of the same. The cuts 2 and 3 also extend diagonally across the ring between the inner and outer peripheries of the same.

Figure 3:
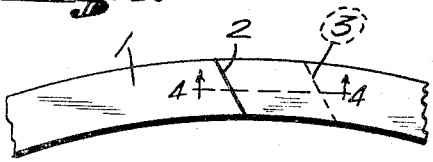
Fig. 3 is a plan view of the piston ring at the joint therein, showing the ends of the ring overlapped in the compressed position of the ring.
Figure 4:
Fig. 4 is a detail section on the line 4—4 of Fig. 3.
Figure 2:
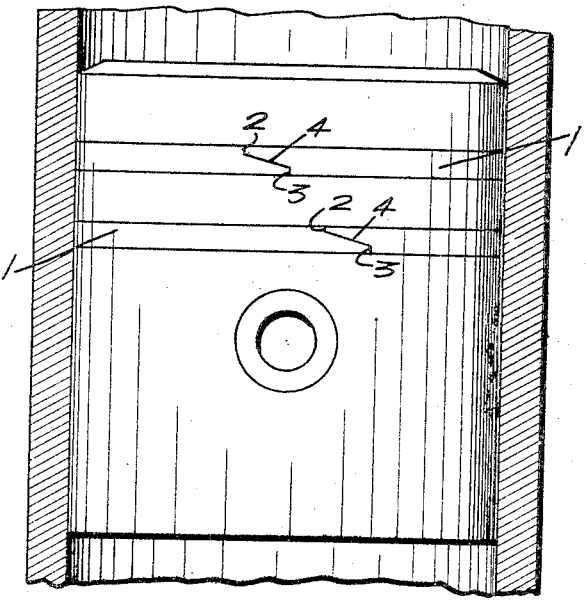
Fig. 2 is a longitudinal section through a cylinder having a piston therein provided with the improved piston rings.

The ring, as thus constructed, is so arranged that when in normal position before compressed within a piston ring groove, the ends of the ring are spaced apart, as clearly shown in Fig. 1. When the ring is compressed within its groove the split ends of the same will overlap, as clearly shown in Figs. 3 and 4, and as a result the inclined surfaces of the ring ends forming the split 4 riding upon one another, will cause the ends of the ring to tend to move out of alinement longitudinally of the piston. The respective side surfaces of the piston will thus be forced into more intimate contact with the sides of the piston ring groove. At the same time the ends of the piston ring will tend to move out of alinement with relation to the circumference of the piston, through contact of the inclined surfaces forming the splits 2 and 3 extending across the piston ring between its inner and outer peripheries. This will cause more intimate engagement of the piston ring in the base of the piston ring groove and also with the wall of the cylinder.

Various changes may be made without departing from the spirit of the invention as claimed.

What is claimed is:

A piston ring comprising an annular body rectangular in cross section, said body being provided with substantially parallel cuts extending inwardly from the opposite side faces thereof, about a quarter of the thickness, and then split in a plane extending diagonally from the inner ends of the mentioned parallel cuts, the said cuts also extending diagonally across the ring between the inner and outer faces.

In testimony whereof I have signed my name to this specification.

MORRIS A. DAVIS.